(12) United States Patent
Vienneau et al.

(10) Patent No.: US 8,645,403 B2
(45) Date of Patent: Feb. 4, 2014

(54) DATABASE-MANAGED RENDERING

(75) Inventors: Christopher Vienneau, Montreal (CA); Charles Martin, Montreal (CA); David Boileau, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 1904 days.

(21) Appl. No.: 11/346,953

(22) Filed: Feb. 3, 2006

(65) Prior Publication Data

US 2007/0198584 A1  Aug. 23, 2007

(51) Int. Cl.
  *G06F 7/00* (2006.01)
  *G06F 17/30* (2006.01)

(52) U.S. Cl.
  USPC .......................................... 707/756; 707/825

(58) Field of Classification Search
  USPC ......................... 707/104.1, 756, 825; 382/100
  See application file for complete search history.

(56) References Cited

U.S. PATENT DOCUMENTS

| | | | |
|---|---|---|---|
| 5,821,945 A | 10/1998 | Yeo et al. | |
| 6,130,676 A | 10/2000 | Wise et al. | |
| 6,366,934 B1 | 4/2002 | Cheng et al. | |
| 6,529,905 B1 | 3/2003 | Corsberg et al. | |
| 6,636,869 B1 * | 10/2003 | Reber et al. | 386/278 |
| 7,064,760 B2 | 6/2006 | Capin et al. | |
| 7,149,755 B2 | 12/2006 | Obrador | |
| 7,281,206 B2 | 10/2007 | Schnelle et al. | |
| 7,383,504 B1 | 6/2008 | Divakaran et al. | |
| 7,386,577 B2 * | 6/2008 | Arning et al. | 707/703 |
| 8,131,725 B2 * | 3/2012 | Prahlad et al. | 707/739 |
| 2001/0029505 A1 * | 10/2001 | Gaudette et al. | 707/102 |
| 2002/0023113 A1 | 2/2002 | Hsing et al. | |
| 2002/0059302 A1 * | 5/2002 | Ebihara | 707/104.1 |
| 2004/0194020 A1 | 9/2004 | Beda et al. | |
| 2004/0230893 A1 | 11/2004 | Elza et al. | |
| 2004/0243635 A1 * | 12/2004 | Christophersen et al. | 707/104.1 |
| 2005/0041040 A1 * | 2/2005 | Fukuda et al. | 345/619 |
| 2006/0026226 A1 * | 2/2006 | Walls et al. | 709/201 |
| 2007/0027913 A1 * | 2/2007 | Jensen et al. | 707/104.1 |
| 2011/0047170 A1 * | 2/2011 | Thomas et al. | 707/756 |
| 2011/0082871 A1 * | 4/2011 | Peters, II | 707/756 |

OTHER PUBLICATIONS

Anderson et al., SVG 1.1 Specification Recommendation Jan. 14, 2003, W3C.
IBM Corp., IBM DB2 Connect User's Guide, 2002, IBM Corp.
Quint, Digging Animation, Jan. 23, 2002, XML.com.
Giradot et al., Efficient Representation and Streaming of XML Content over the Internet Medium, 2000, IEEE.

* cited by examiner

*Primary Examiner* — Jacob F Bétit
*Assistant Examiner* — Bao Tran
(74) *Attorney, Agent, or Firm* — Gates & Cooper LLP

(57) ABSTRACT

A method, apparatus, system, and article of manufacture provide the ability to track image processing data in a collaborative environment in a database. Non-creative information is received that relates to image processing. The non-creative information is generated by a computer pursuant to a rendering operation performed by the computer. The non-creative information is stored in a database that is accessible across a network to multiple users. Once stored, the non-creative information may be evaluated (e.g., to provide a profitability or cost/benefit analysis).

15 Claims, 6 Drawing Sheets

DATABASE-MANAGED RENDERING

CROSS-REFERENCE TO RELATED APPLICATIONS

This application is related to the following co-pending and commonly-assigned patent application, which application is incorporated by reference herein:

U.S. patent application Ser. No. 11/347,552, entitled "DATABASE-MANAGED IMAGE PROCESSING", by Christopher Vienneau, Charles Martin, and David Boileau, filed on Feb. 3, 2006;

BACKGROUND OF THE INVENTION

1. Field of the Invention

The present invention relates generally to image/video display and processing systems, and in particular, to a method, apparatus, and article of manufacture for tracking rendering information using a database and viewing such information once rendering is complete.

2. Description of the Related Art

A clip is a sequence of images or frames loaded from an external device such as a VTR (video tape recorder), stored in digital format, and displayed in a clip library and on a desktop. Clips may be edited, combined, processed, and recorded to/on external devices. The production of a final clip sequence is typically performed by a "render-farm," a large number of dedicated computers that are used exclusively for image/clip rendering. However, while the individual dedicated computers may determine or track relevant information during the rendering process, such information is merely maintained on a per-rendering session basis and a log of the information is not retained. Further, the information cannot be linked to the design stage of clip processing nor can the information be used to calculate costs or evaluate time and financial information that is based on the rendering. Such problems may be understood with an explanation or prior art clip processing and rendering.

Post production of sequences for film and video is an extremely complex and expensive undertaking. Each clip may have dozens of separate elements/operations that need to be combined/composited, each individual element requiring significant effort on the part of a digital artist. For example, to composite a moving car onto a new background may require a mask for the car be cut and perfected for every frame of the sequence.

Professional compositing software helps digital artists and managers visualize the process of clip development/design by building a "dependency graph" of elements and effects for each sequence. In such software, operators, tasks, or modules/functions perform a variety of functions with respect to a clip or source. For example, a module may perform compositing, painting, color correction, degraining, blurring, etc. A dependency graph of such software may also be referred to as a process tree or a schematic view of a process tree. Such a tree illustrates the elements and effects needed to complete a sequence of functions and identifies the hierarchy that shows the relationship and dependencies between elements. Accordingly, as the end-user interacts with media and tools in a schematic view, the system constructs a graph representing the activity and the relationships between the media and tools invoked upon them. The purpose of the dependency graph is to manage and maintain the relationships between the nodes representing the media and the tools.

FIG. 1 illustrates a process tree in a schematic view. A schematic view 100 uses node(s) 102-104 to represent all of the operators in a workspace performed on one or more clips 106-110, and line(s) (edges) 112-118 between nodes clips 106-110 and nodes 102-104 to indicate the flow of image data between the operators. The output of one node 102 is the source for the next node 104. As a result clip 104 or other branch (e.g., paint or color correction projects 102) is created, the process tree indicating the flow of data through the nodes 102-104 is built automatically. As illustrated in FIG. 1, various source nodes in the form of clips 106-110 are utilized. As illustrated, front clip 106, back clip 108, and matte clip 110 may be utilized by color correction node 102. The color correction node 102 performs an operation (i.e., a color correction to the clips 106-110) on the clips 106-110 to produce a result/output 104.

As used herein, an operator (e.g., color correction operator 102) is the most common node. Alternative nodes may be used to connect two nodes. The process tree (such as the process tree illustrated in FIG. 1) can be used to manage operators and nodes. For example, users may add operators (e.g., a paint operation) to a branch, change the process order of operators 102-104, and navigate easily between operator controls. Further, if an operator is added to a layer in a schematic view 100, the operator will appear as a node (e.g., the color correct node 102). The same operator node may also appear in other workspace environments (e.g., a workspace panel). Further, in the schematic view, particular operators may be turned on/off as desired simply by clicking on the icon for that operator.

Thus, as described above, the dependency graph is the record of end-user activity in the creative application. The dependency graph is constructed by the system dynamically, consists of various nodes and connections, and is represented in the user interface as the schematic view 100. As the end-user manipulates media by editing, applying tools, etc., the creative application constructs a dependency graph reflecting the structure of the composition. For example, when the end-user drops a keyer into the schematic 100, the system creates an instance of a tool node for the keyer in the dependency graph 100.

Thus, the dependency graph consists of tool nodes, link nodes, and occasionally, group nodes. Tool nodes represent the invocation of a tool and its parameters. Link nodes connect the graph 100 to the published result of another composition and group nodes can be created by an end-user to arrange nodes together in the schematic 100 for visual clarity.

While the assembly and sequencing of clips and clip elements during the design phase is usually performed by artists on individual workstations, the production of the final clip sequence is typically done by a "render-farm," a (large) number of dedicated computers (that may be geographically distributed across a network) that are used exclusively for image/clip rendering.

The rendering that is farmed out to these workstations is managed by special software (referred to as rendering management software) that monitors the status of individual machines and manages parsing out individual render tasks as machines become idle. However, the prior art fails to provide a mechanism to tie or link information generated by the rendering-management software (e.g., length of time taken for rendering, which machines were used, how much storage was consumed, etc.) with information generated in the design phase (e.g., how long each design element took to produce, etc.).

Accordingly, it is impossible in the prior art for post-production companies to obtain or maintain knowledge of information such as whether a job was profitable, which compositing techniques were/are efficient (for design and/or production), the cost for individual clip elements, the number of different variations of a given sequence that were created, which artist worked on a particular shot/project, etc. Understanding the financial impact of various design decisions is often critical to the viability of such post-production companies. However, the prior art fails to provide an efficient mechanism for tracking, maintaining, and viewing such information.

In view of the above, what is needed is a mechanism to effectively and efficiently obtain and view creative and non-creative aspects of clip processing/rendering.

SUMMARY OF THE INVENTION

A relational database management system (RDBMS) is integrated directly with post-production compositing software and with render-management software. The RDBMS keeps track of both.

Each element worked on by an artists or that contributes to the rendering pipeline is tracked independently by the RDBMS, which is located on a centralized server. Thus, with the cost per hour for digital artists input, the system may track how much time was spent by each artist and the cost to develop each sequence. The same clip elements are tracked through to the final rendering, including which machines were used and the amount of time consumed/spent. By inputting the average hourly machine cost, the backend rendering costs for each sequence may be determined/known. Combining the digital artists cost with the rendering costs, the system provides the ability to determine the total cost per sequence.

Accordingly, with embodiments of the invention, a post-production company can understand and determine which jobs are profitable, and make intelligent decisions on which artists and hardware are appropriate for specific kinds/types of client work.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
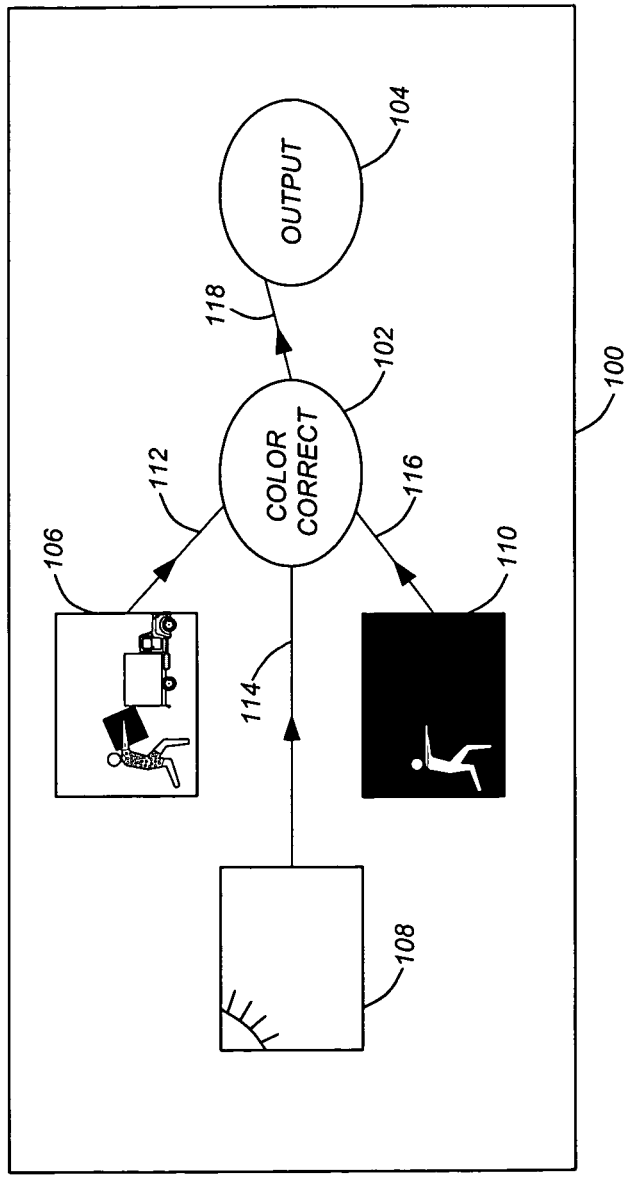
FIG. 1 illustrates a process tree in a schematic view.
Figure 2:
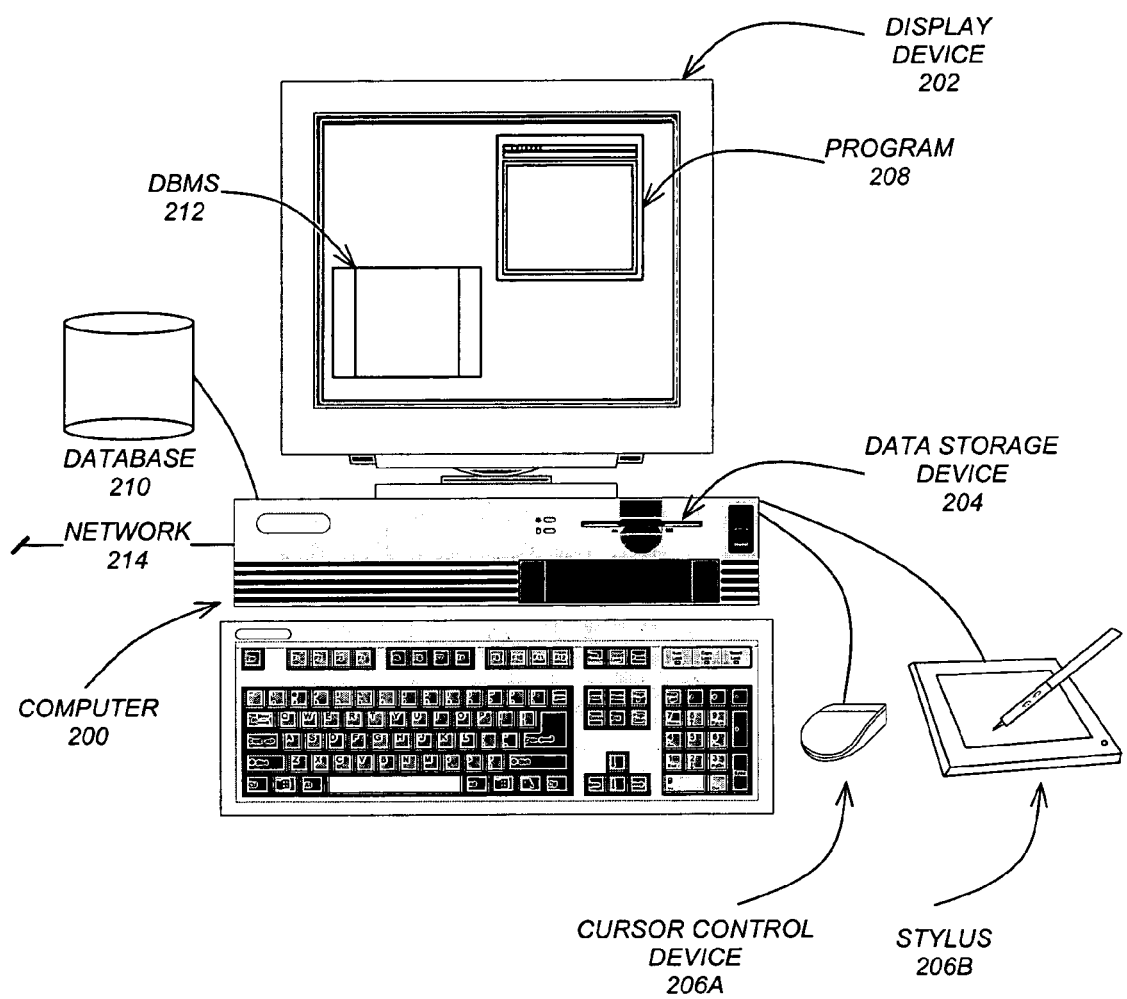
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage device(s) 204, cursor control devices 206A, stylus 206B, database 210, network connection 214, and other devices. Those skilled in the art will recognize that any combination of the above components, or any number of different components, peripherals, and other devices, may be used with the computer 200.

One or more embodiments of the invention are implemented by a computer-implemented program 208. Such a program may be a procedural renderer (i.e., an application that provides the ability to edit operators in a schematic view), a paint application, a media player, a video editing program, an effects program, compositing application, or any type of program that executes on a computer 200. The program 208 may be represented by a window displayed on the display device 202. Generally, the program 208 comprises logic and/or data embodied in or readable from a device, media, carrier, or signal, e.g., one or more fixed and/or removable data storage devices 204 or databases 210 connected directly or indirectly to the computer 200, one or more remote devices coupled to the computer 200 via a data communications device, etc. In addition, program 208 (or other programs described herein) may be an object-oriented program having objects and methods as understood in the art. Further, database 210 may be managed by a database management system (DBMS) 212.

Database 210 may be accessible by program 208 (e.g., through DBMS 212) and may store the program itself or information accessed by such program. Further, such a database 210 may be a relational database wherein a set of separate, related files (tables) are maintained and data elements from the files are combined for queries and reports when required. The database 210 may be managed by a database management system (DBMS) 212 (also referred to as database server) comprised of software 208 that controls the organization, storage, retrieval, security, and integrity of data in the database 210. Such a DBMS 212 or a relational DBMS (RDBMS) accepts requests from program 208 to access the data and instructs the operating system to transfer the appropriate data. One or more embodiments of the invention may utilize an RDBMS 212 available from Oracle™, IBM™, Microsoft™, and/or Sybase™. Further, the database may be distributed database system wherein information is stored in multiple storage units may or may not be geographically diverse and managed by a centralized DBMS 212 via network 214.

In one or more embodiments, multiple computer systems 200 or databases 210 are communicatively coupled via network 214 to establish a collaborative environment.

Figure 3:
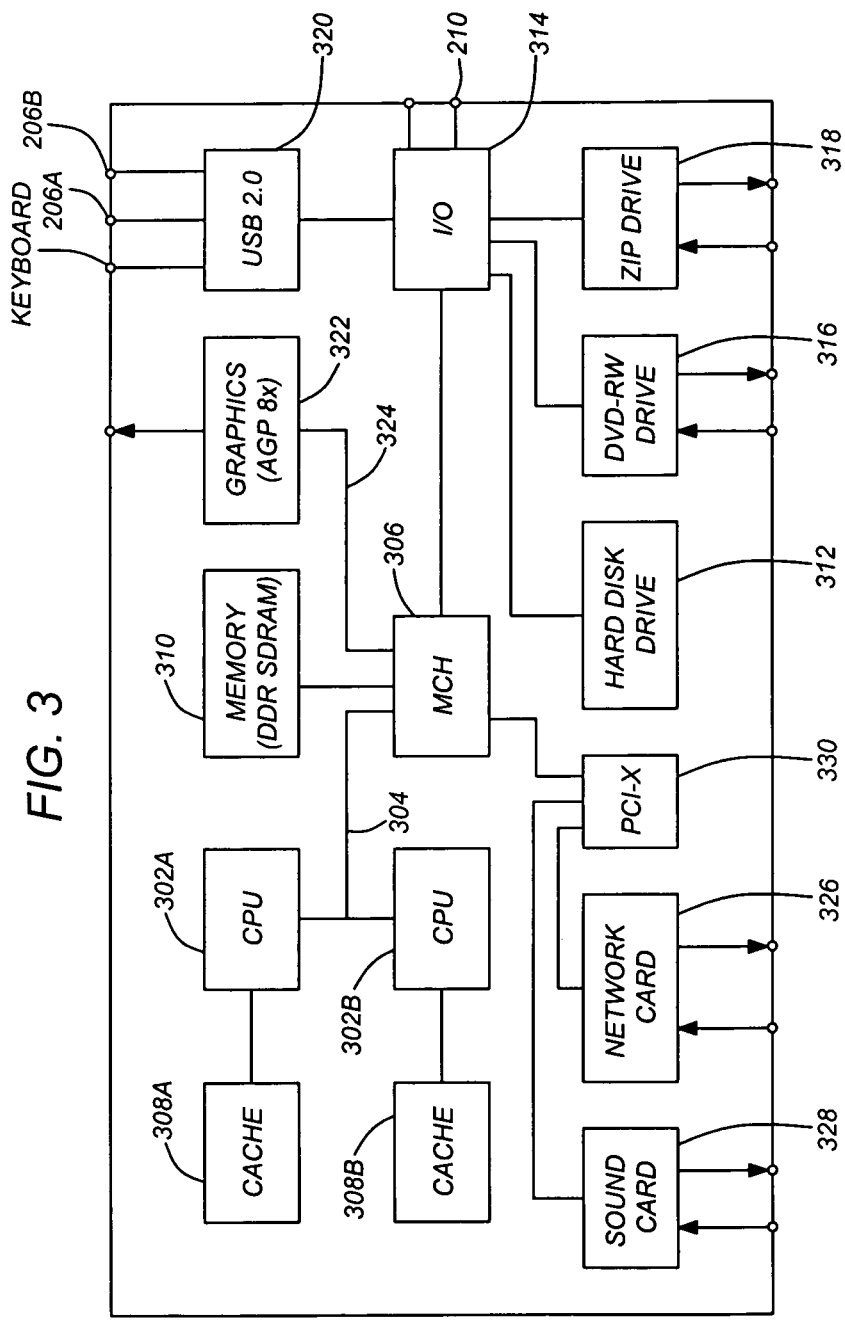
FIG. 3 illustrates details of the components of the computer system of FIG. 2 in accordance with one or more embodiments of the invention.

The components of computer system 200 are further detailed in FIG. 3 and, in the preferred embodiment of the present invention, said components are based upon the Intel® E7505 hub-based chipset.

The system 200 includes two Intel® Pentium™ Xeon™ DP central processing units (CPU) 302A, 302B running at three Gigahertz, that fetch and execute instructions and manipulate data via a system bus 304 providing connectivity with a Memory Controller Hub (MCH) 306. CPUs 302A, 302B are configured with respective high-speed caches 308A, 308B comprising at least five hundred and twelve kilobytes, which store frequently-accessed instructions and data to reduce fetching operations from a larger memory 310 via MCH 306. The MCH 306 thus co-ordinates data flow with a larger, dual-channel double-data rate main memory 310, that is between two and four gigabytes in data storage capacity and stores executable programs which, along with data, are received via said bus 304 from a hard disk drive 312 providing non-volatile bulk storage of instructions and data via an Input/Output Controller Hub (ICH) 314. Hard disk drive 312 may maintain a file system for storing media content. In this regard, the file system on disk drive 312 may be an NTFS file system or FAT file system.

The I/O hub 314 similarly provides connectivity to DVD-ROM read-writer 316 and ZIP™ drive 318, both of which read and write data and instructions from and to removable data storage media. I/O hub 314 provides connectivity to USB 2.0 input/output sockets 320, to which the stylus and tablet 306B combination, keyboard, and mouse 306A are connected, all of which send user input data to system 200. Further, the I/O hub 314 may communicate and provide the ability to access data and information stored on database 210.

A graphics card 322 receives graphics data from CPUs 302A, 302B along with graphics instructions via MCH 306. The graphics card 322 may be coupled to the MCH 306 through a direct port 324, such as the direct-attached advanced graphics port 8X (AGP 8X) promulgated by the Intel® Corporation, the bandwidth of which exceeds the bandwidth of bus 304. The graphics card 322 may also include substantial dedicated graphical processing capabilities, so that the CPUs 302A, 302B are not burdened with computationally intensive tasks for which they are not optimized.

Network card 326 provides connectivity to a framestore or other computers 200 by processing a plurality of communication protocols, for instance a communication protocol suitable to encode and send and/or receive and decode packets of data over a Gigabit-Ethernet local area network. A sound card 328 is provided which receives sound data from the CPUs 302A, 302B along with sound processing instructions, in a manner similar to graphics card 322. The sound card 328 may also include substantial dedicated digital sound processing capabilities, so that the CPUs 302A, 302B are not burdened with computationally intensive tasks for which they are not optimized. Network card 326 and sound card 328 may exchange data with CPUs 302A, 302B over system bus 304 by means of Intel®'s PCI-X controller hub 330 administered by MCH 306.

Those skilled in the art will recognize that the exemplary environment illustrated in FIGS. 2 and 3 are not intended to limit the present invention. Indeed, those skilled in the art will recognize that other alternative environments may be used without departing from the scope of the present invention.

Software Environment

As described above, a software application 208 such as a video effects program, post-production compositing software, a procedural renderer (that permits the viewing of different operations schematically), or rendering management software may execute on computer 200. In embodiments of the invention, such a software application 208 (or a collection of software programs [e.g., post-production compositing software and render-management software]) is/are directly integrated with a relational database management system 212. Each element that is used by a node 102-106 in a dependency graph 100 is tracked independently by the RDBMS 212 that is cited on a centralized server. With the integration, the post-production software 208 can report on the state of any particular element of the dependency graph 100/rendering pipeline.

Thus, the RDBMS 212 allows a creative application 208 (e.g., a compositing software) to store and retrieve composition data. Data stored in the database 210 is information related to projects and users, including folders, compositions, user-defined attributes, desktops, user and project settings, etc. The database 210 stores all date related to current projects, but does not store image data. Image data is typically read from ordinary image files and cached locally in the mediastore (see detailed description below). In addition to enabling the application 208 to be used collaboratively, the RDBMS 212 relieves the end-user of explicitly having to save data. In this regard, all user actions are saved on a virtually continuous basis.

In view of the above, the RDBMS 212 (through database 210) maintains knowledge of which clips are in-process, finished, open, and how long each has been worked on. Critical-path clips/tasks can be automatically identified. Further, if multiple variations of a clip have been created, the post-processing software 208 provides an interface for quickly selecting a variation, and previewing the entire rendering sequence using the selected variation.

The render-management aspects of the software 208 further allows the rendering aspects of the invention to be tracked by the RDBMS 212 (through database 210). In this regard, non-creative information such as the time taken to perform certain tasks may be recorded in the database 210. Further, cost based information may also be stored in the database 210. Thus, the database 210 stores both creative information (e.g., information relating to work performed by artists in the design stage such as setup information [image processing graphs to create 3D objects to build up scenes], project information [the name of the project, client, where rendered to, end format of movie, etc.], user information [who the user/artist is, what the user's role is, etc.]) and non-creative information. Accordingly, all dependencies, both creative and non-creative are stored in a single database 210 in a collaborative environment.

The integration of the DBMS 212 with the software 208 provides the ability to have multiple people work on one or more projects and to have dependencies tracked between people and to conduct a cost and profitability analysis based on non-creative information stored during execution of the image processing or rendering.

Database Structure

As described above, elements and information within nodes 102-106 may be stored in a database 210. In addition, some of the media content (e.g., scene information 106 and 108) may also be stored in a database 210 or on a file system such as NTFS within hard disk drive 312. However, in a collaborative environment, media content may need to be centrally located for access to all collaborators. Accordingly, a central repository (also referred to as a central mediastore) may be used to store media files for media content referenced by one or more compositions. In addition, to expedite the processing and access to the data, it may be desirable to store the media content locally. As described above, metadata for the acts performed by nodes in a composition may be stored in central location/database 210. Such metadata may also be locally cached.

In view of the above, one or more embodiments of the invention support local caching of the referenced media (i.e., image data) and/or metadata. Further, some internally generated media such as intermediate results and thumbnails may also be locally cached. By using a local cache, network traffic may be reduced when the referenced media is stored remotely. It also helps in achieving interactive performance and if properly equipped, the local cache can deliver real time performance.

Embodiments provide for one cache per computer/machine 200 and its content is private to the machine. As used herein, the locally cached media (and metadata) may be in the form of a normal file on the file system (e.g., NTFS) (e.g., on hard disk drive 312) wherein Win32 calls are used to access it. In order to synchronize multiple processes using the cache, a shared arena may be needed.

Local caching may be used to store referenced target streams, proxies, rendered results, intermediate results, and thumbnails. In addition, referenced frames (and/or metadata) may be copied into the local cache on usage (by default). Further, media content (and/or metadata) may be stored in the local cache in various circumstances. For example, a needed media frame or metadata may be cached on demand. In addition, media or metadata may be cached upon request about a composition, (e.g., from a hotkey, browser function, or scripting). Such caching upon request may be performed as a background task. Further, if intermediate results and thumbnails are locally cached, they may be internally generated on demand and not fetched.

The local cache manages itself in an automatic matter. If no more space is available in the local cache, old media/metadata is removed to provide place for the newly accessed media. Further, the evicted material may be automatically chosen using a least recently used (LRU) algorithm (e.g., on a per stream or per chunk basis). The LRU is managed locally or by a central database 210 using a stored procedure (e.g., to emulate trigger on select; select chunkid, mark_accessed (chunkid) from OmMediaChunk).

Metadata Overview

As described above, data relating to a composition including user based information, the attributes and properties of a node, etc. may be collected and stored in metadata. In accordance with embodiments of the invention, metadata is presented to the user via a user interface that interacts with a database 210 that actually contains/stores the metadata.

So that the user can more easily visualize and understand the data, the user interface presents the information in a logical manner. Accordingly, the user interface and application programming interface (that provides an additional mechanism for accessing the metadata) provides the capability to interact and query the metadata stored in underlying tables of a database. The user interface presents the metadata to the user in a familiar form. In this regard, a virtual folder structure may be presented to the user with a root and various folders/subfolders. Within the folders are various setups or dependency graphs (i.e., image processing trees). Accordingly, each setup has various nodes including media nodes (i.e., that refer to image data), image modifier tools (e.g., that perform some sort of image modification such as degraining, compositing, blurring, etc.), and output nodes (that identifies where the result is written to). The folders may also include project information that identifies project-related information such as the director's name, client name, title of project, location, etc.).

All of the metadata presented via the API or UI is stored in the database (e.g., in various tables). The metadata stored in the tables may also be used to recreate a dependency graph if necessary. Accordingly, the metadata provides attribute information relating to the various nodes within a dependency graph.

Non-Creative Based Information Storage

In the prior art, an actual person must manually determine which computer or render farm will conduct which tasks. In this regard, such a person may manually fill out a form with all necessary information so that it is available to the render farm. An additional person, referred to as a render wrangler (the system engineer that is responsible for managing the render farm of networked computers) commences rendering jobs and based on the information, decides who is assigned a particular task. However, in the prior art, only a minimal amount of information was available outside of the render farm. For example, the prior art merely provided a task number or name. In this regard, none of the task assignments, project related information, user name, or the context of the task performed were stored, available, or maintained in the prior art.

In view of the above, post production companies are unable to determine the cost for performing certain actions or the time spent on a given activity. Accordingly, there is no mechanism to determine if a project is profitable, who the most productive artist is, which person is better suited for particular tasks, the length of time taken to perform a particular task, etc. Such information is useful for improving operations and production in the future.

One or more embodiments of the invention stores non-creative information and provides cost analysis that leverages data located in a centralized database 210. Such non-creative information may also be referred to as computer generated information. In this regard, certain tasks performed during rendering are automated. For example, computers in a render farm may archive data every night or render setups to generate images on disk. In another example, when a film is scanned, a computer may automatically analyze the image and try to remove scratches or remove grain. Information collected during such automated activities are written back into the database 210 that is centrally located.

In view of the above, non-creative information relevant for a particular element or clip in a dependency graph or generated during rendering is stored in the database 210. Thus, the tables in the database may be used to store additional information that is associated with elements in the dependency graph. Examples of information that may be stored include CPU cycles, processing time, and relevant personnel (e.g. artist). For example, the number of CPU processing cycles of a renderfarm and/or length of time needed to generate a given asset or images for a given setup may be stored. In another example, the artist that made a request to render images may be stored.

Accordingly, for a particular shot/scene, a time column may be added to the database 210 that allows a calculation of the aggregate time taken, the amount of hardware used, etc., to generate a particular image/shot over a life span. Thus, the system enables more than just information relevant to the end result, but allows the accumulation and aggregation of data over the life span of a particular setup, shot, scene, project, image, etc. Such information enables a manager to determine if a particular setup or shot consumed an extra long or excessive amount of time. Further evaluations may also be performed to determine if a particular artist rendered the image excessively or if the artist spent an excessive amount of time (thereby indicating the effectiveness/efficiency of an artist). Such information also enables one to determine if a project manager failed to properly prioritize the processing.

As indicated above, the information that is stored in the database is computer generated during the rendering process by individual computers. Accordingly, the information may not be available until a task, project, shot, etc. has completed rendering. Thus, upon the completion of the rendering operation/job, the information is recorded back into the database for every job. Such information may be written back to the database on a project, scene, setup, shot, etc. basis. Further, the information is recorded into the database with a particular context in that a relationship or association of the information to a shot, artist, setup, etc. may also be recorded. The context with which the information is stored allows the determination of cost/profitability analysis. For example, the different times, cost per hour, and budget may be utilized in a comparison to determine if a particular job, project, setup, etc. was profitable. Such evaluations can be performed on a per person, computer, project, render farm, or other basis depending on the information stored in the database 210.

In addition, it is noted that the information is stored in the centralized database 210 across multiple users. Accordingly, regardless of the number of render farms, artists, etc., that worked on a particular project, all of the non-creative/computer generated information is stored across all of the users. Such network/collaborative based information provides a unique and distinct advantage over information available in the prior art on a per-session basis that could not be aggregated or combined over multiple users in a collaborative environment.

Additional embodiments of the invention may also provide such computer generated information with respect to the editing process. For example, embodiments may constantly (or in pseudo real time) update an edit structure. A studio or post production company may then be provided with information based on the dependencies of each shot such as how a particular shot was created and/or who was working on a particular shot. Further, rather than relying on a render wrangler or editor to select a particular render farm or to designate which render farm performs which work, the software would enable a studio to perform such tasks since information relating to such rendering information is available to the studio (e.g., via the database 210). Further, when a shot has been completed, metadata and the non-creative based information may be delivered to the studio for further work (e.g., for inclusion on a DVD version of a movie, or for further editing).

Application Programming Interface (API) Overview

The API provides the ability to easily access and utilize metadata and image data stored in the database 210. One or more embodiments of the invention utilize an API in the form of scripts that may be used to perform rendering, project setup, media import, database creation and management. Further, such scripts may be written or used in conjunction with programs written in C, C++, PYTHON, or any other programming language. In addition, various buttons of a UI may be associated with or used to launch a particular task or execute a particular script.

As described above, the dependency graph describes a composition. The API provides access to the tools and internals of the composition (as stored in the database 210). The API may be used to create, modify, and delete nodes, make, modify, or remove connections between nodes, create and set dynamic values and set the input values of nodes. In addition, the API provides access to the metadata and published results of a composition.

Thus, a composition has various nodes. Some of the nodes are tools nodes that represent a call to a tool. Other nodes may be used to provide access to the internals of the composition/dependency graph. Nodes have input and output sockets. An input socket can be connected to an output socket of another node, and vice-versa. An output socket may be connected to multiple input sockets. However, an input socket may be configured to accept a connection from only one output socket. Sockets may be identified by a name, a layout, a direction (e.g., input or output), a lifescope (e.g., static or dynamic; a dynamic lifescope means that the socket was added dynamically after the node was created), and a data type that describes the kind of data that flows through the socket when the graph is processed (inputs and outputs of connected sockets may be required to have matching data types).

The layout of a socket may be a single-valued socket (a socket that accepts a single connection, a multi-valued socket (a variable-size vector of sockets of the same data type), or a structured socket (a container of other sockets, where each contained socket has an associated name).

Thus, the API is used to store and retrieve all of the information relating to the various tools/nodes of a dependency graph. The properties of each of the nodes and tool nodes may also be added or retrieved via the API. For example, the name, input, and layout may be created and added, removed, or retrieved for a tool node. Nodes may also be grouped together to provide structure within a graph in the form of a group node. In addition, a value node (a node that feeds a constant or animated value to its output), a boundary node (a node that is used within a group to provide a published input/output to the group node), and/or a link node (a node that connects the output of a published result tool node in another graph into a current graph) may be added, removed, or accessed via the API of the invention.

In addition, as described above, the database components may be accessed as a virtual file system via the API. In this regard, the API may be used to create, remove, modify, or access a database 210 (e.g., via creating, removing, or accessing folders, trees, paths between nodes, attribute information, setups, etc.). In addition, attributes in the database that may be accessed via the API may include information relating to a folder, graph, tool, project, user, machine, and/or setup. For example, the API may be used to search all of the objects (e.g., relating to folders, graphs, tools, projects, etc.) in a database created by a particular person or the time of creation. Alternatively, the projects may be searched for a particular project ID. In this regard, the API or standard SQL (or other query language) may be used to add, remove, modify, or access information relating to media content and metadata stored in the database 210.

Similarly, the API may be used to create a user interface that facilitates interaction between the user and the database. For example, the API may be used to create a dialog box with a series of buttons that are linked to other API calls/scripts to perform a variety of desired actions.

Database Table Embodiments

Figure 4:
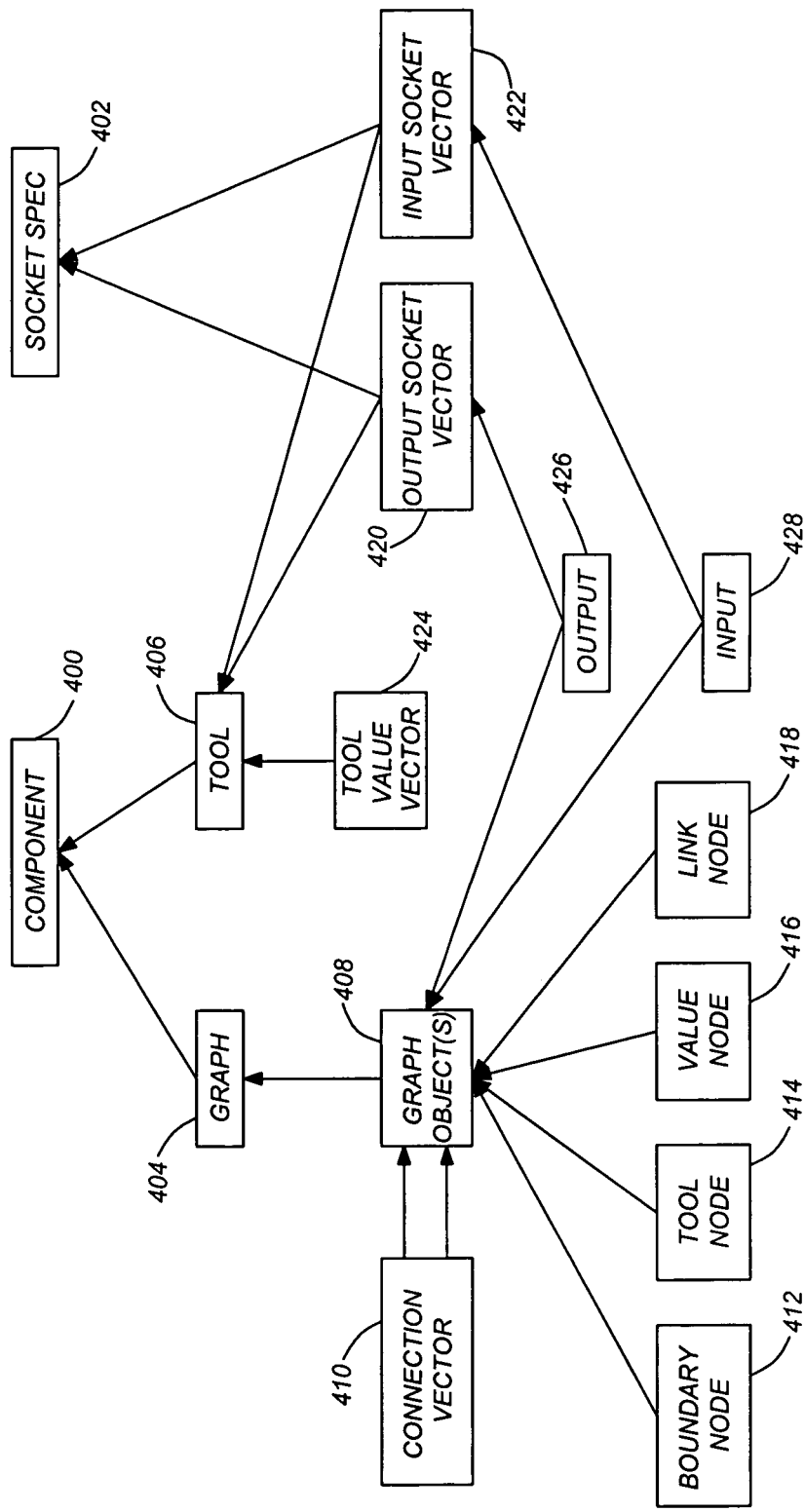
FIG. 4 illustrates examples of various tables that may be used to store metadata in accordance with one or more embodiments of the invention.

FIG. 4 illustrates examples of various tables that may be used to store metadata in accordance with one or more embodiments of the invention. There are two primary tables that all of the other tables refer to—component table 400 and socket spec table 402. The component table 400 is referenced by a graph table 404 and tool table 406. Accordingly, the graph table contains a listing of the various dependency graphs for the network. The graph table 404 is referred to by one or more graphic object(s) that are identified in a graph object table 408. Connection vectors 410 are used to connect various graph objects and are listed in a connection vector table 410. Each graph object identified in graph object table 408 may be referred to by various nodes listed in a series of tables including a boundary node table 412, tool node 414, value node 416, and/or link node 418. The various nodes 412-418 make up the various nodes of the dependency graph.

In addition, the socket spec table 402 may be referenced by an output socket vector table 420 and input socket vector table 422, both of which may reference a tool identified in tool table 406. These output and input socket vectors identify the sockets as described above. An additional table may include a tool value vector table 424 that refers to tools in tool table 406. Such tool value vectors may simply contain an identification and name for a tool in tool table 406. Output table 426 and input table 428 further define the output from a graph object 408 based on an output socket vector 420 and the input to a graph object 408 based on input socket vector 422.

Thus, as illustrated in FIG. 4, various tables may be used to coordinate, organize, and store the various features and attributes of a dependency graph. These tables may be directly accessed via SQL queries. Alternatively, as described above, an API may be used to present the information in a more understandable and user friendly manner.

Collaboration

In a collaborative environment, various rules or access restrictions for a database that is being accessed my multiple users should be enforced. In the collaborative environment, the media (e.g., image data) and metadata (i.e., data relating to actions performed by the user and information relating to the media) are shared among all of the users. When someone creates a new element, everybody in the system is able to see it. In one or more embodiments of the invention, first come-first served is the basic logic. In this regard, the first user to edit an element is the only writer. The other users can only see a consistent read-only snapshot until the writer stops writing.

A few basic facts about a collaborative environment are useful: All users can simultaneously log into the environment. All users can read any elements desired in the system. Users may collaborate among themselves and with the remote background tasks. Only one user may be permitted to modify a given element at a time. However, it is possible to get a consistent snapshot of a currently edited element. Lastly, users can manually lock elements.

In a collaborative environment, the present invention provides the ability to perform various operations. For example, the system provides the ability to preview a composition while it is being rendered. Further, a composition may also be previewed while another user is working/viewing the composition. In addition, a composition may be generated/regenerated based on the metadata alone.

Embodiments provide the ability to utilize a snapshot mode that consists of a protocol that solves the reader-writer problem in a first come first served collaborative environment. A feature of the snapshot mode provides that readers never wait for the writer to complete its writing operation. However, writers will wait among themselves. A snapshot is a consistent transient copy of a database object stored in the local database cache of an application 208.

At first, any user can browse or issue any read-only operation on library elements, thus the user is are working with up-to-date snapshots. As long as read-only operations are performed on a given element, every user has an up-to-date snapshot in their database cache. At this point, a write operation is available to any user.

When a user commences modifying an up-to-date snapshot, then all other snapshots become out-of-date and cannot become writable. However, the out-of-date snapshot can be updated, in order to get the latest modifications from the writer. Asking for a refresh on an out-of-date snapshot results in an up-to-date snapshot that can be modified. For example, assume users A and B are browsing in the same folder. The folder's elements are stored in the user's database cache as up-to-date snapshots. User A modifies an element (e.g., via a rename operation), and causes user B's snapshot to become out-of-date. To be able to perform some modifications, the user B needs to first update it's snapshot subsequent to which user B can perform write operations.

Compositions may be linked together through rendered results. Further, once published, the rendered results are read-only wherein a composition can be edited while other compositions that refer to it can also be edited at the same time.

Database Lock

A database lock is a mechanism that prevents the other users from becoming a writer on a given snapshot (and/or data stored in a database). Only one database lock can be taken on a given snapshot. A database lock can also only be obtained on an up-to-date snapshot. For example, if user A obtains a database lock on a given snapshot, all of the other users cannot write to their snapshot, even though is it up-to-date. If user A has a database lock on a given snapshot, no other user is allowed to obtain a database lock on it.

The purpose of the database lock is to allow a user to obtain exclusive write access to an element. By preventing external write access, the owner of the database lock is guaranteed that the owner's database-locked snapshot will always be up-to-date and thus interactivity on the database side will never be compromised. Accordingly, a database lock is used when the user needs to work on a given snapshot for an extended period of time.

Snapshot Mode Embodiments

The snapshot mode is applied only to compositions, which may be the only object type that can be edited for an extended period of time.

Opening a composition means trying to obtain the exclusivity on it. The exclusivity, or read write access, is achieved when a database lock is successfully acquired on a given composition. As described above, only one user can have a database lock on a composition at a given time. If a database lock cannot be acquired, then the composition is opened in read-only mode as a snapshot. A user who failed to obtain the exclusivity on a composition can refresh it's snapshot. Refreshing a 'failed' opened composition will update the snapshot and try to obtain a database lock on it again. Updating a composition means loading the last coherent version of the composition out of the database in order to obtain the latest updates.

The user opens a composition by double clicking on it (e.g., using a cursor control device 206A or stylus 206B) or by performing a file—open selection in taskbar. Once opened, the user may view a composition. Such a viewing operation encompasses viewing a read-only snapshot of a composition at the time of the request. The read-only view of the composition may be refreshed to obtain the latest version of the composition. Such a read-only view operation may not be capable of failing. A read-only composition is useful for consultation of a toolnode settings or copy/pastep purposes. The user obtains a read-only view of a composition by performing a file—view operation/selection (e.g., in a taskbar).

When a composition is closed, the transient copy of the composition is deleted. If a database lock was acquired, the lock is then released. When a snapshot is closed there is not way to restore the snapshot because there is no persistent storage for the snapshot (unless the user made either a copy or an archive of it). However, the composition can be reopened again from the content of the database (see description above/below). The user closes a composition by performing a file—close operation/selection in a taskbar. Note that when quitting an application 208, all of the opened compositions may be closed.

Embodiments of the invention include a creative workspace that supports having multiple compositions in the workspace simultaneously. The status of a given composition is independent of the others. One can have as many open compositions in view mode and read-write as desired.

Figure 5:
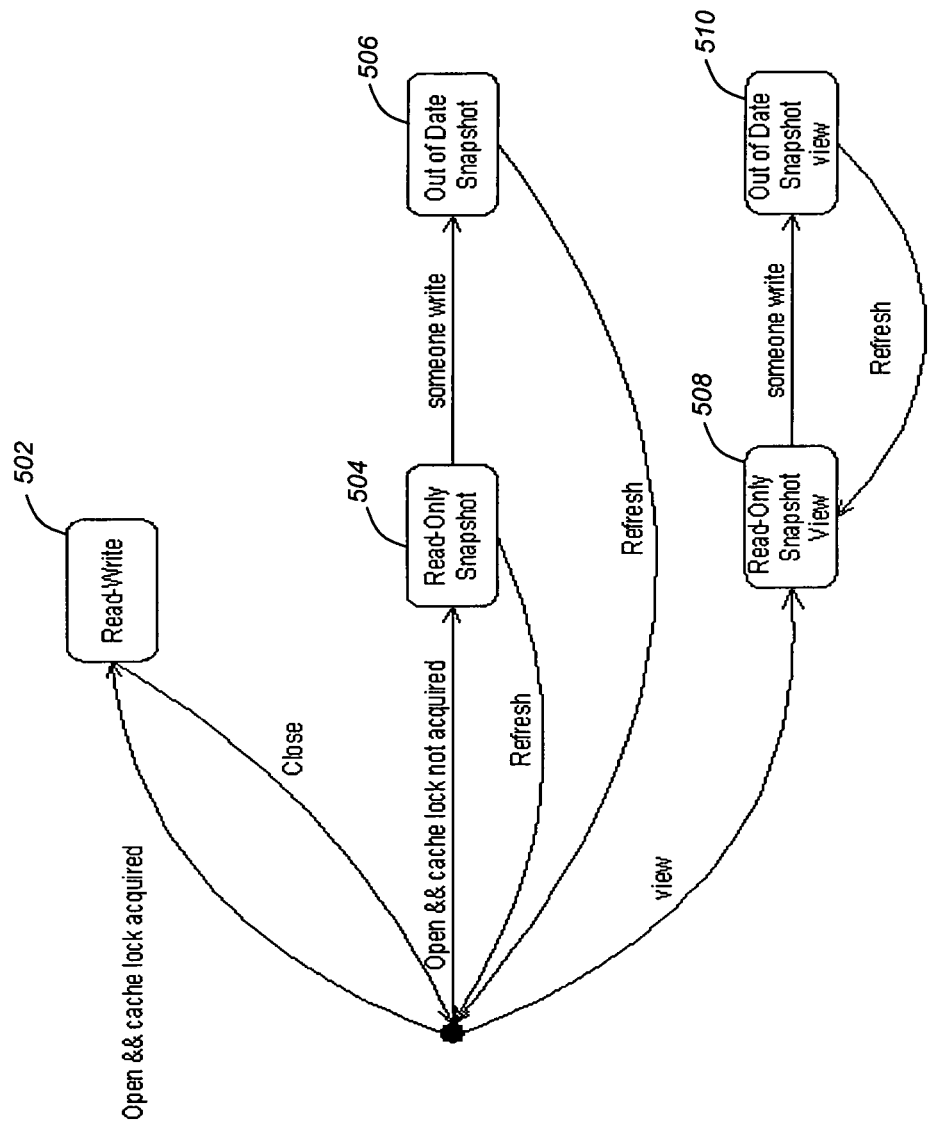
FIG. 5 illustrates a state diagram of a composition inside a creative workspace as seen by the user in accordance with one or more embodiments of the invention.

FIG. 5 illustrates a state diagram of a composition inside a creative workspace as seen by the user in accordance with one or more embodiments of the invention. Various states 502-510 of the composition are illustrated. In the read-write state 502, the user has exclusivity on the composition. Accordingly, the user has opened the composition and acquired a cache lock in the read-write state 502. If the composition is opened but the cache lock is not acquired, the user enters the read-only snapshot state 504. Thus, the user has a read only snapshot of the composition that is still in sync with the database. If another user performs a write operation or modifies the snapshot, the user enters the out of date snapshot state 506 in which the user has a read only snapshot of the composition that is no longer in sync with the database. In both read-only snapshot state 504 and out of date snapshot state 506, the snapshot may be refreshed that starts the user back at the beginning with the option to obtain a lock or not.

The user may also explicitly ask for a read only snapshot of a composition thereby placing the user into read-only snapshot view state 508. In state 508, the composition is still in synch with the database. However, if someone performs a write operation or modifies the snapshot, the user enters out of date snapshot view 410 wherein the composition is no longer in sync with the database. By refreshing the out of date snapshot view, the user's view again becomes synchronised with the database placing the user back in state 408.

The user's desktop (e.g., within application 208) allows users to perform write operations on compositions. An attempt to obtain a database lock is done before performing each write operation and released once a write operation is completed. If a database lock cannot be obtained, then the write operation will fail.

A workspace (also referred to as library workspace) within application 208 displays the states illustrated in FIG. 5 for each composition displayed. Folders within the library may not follow the snapshot mode. Instead, the folders may be refreshed automatically each time a user is writing to it.

An additional workspace (e.g., a system workspace) may be used to enforce a policy wherein only one user at a time can have write access to a given user or project at a time. The first user accessing a given user or project will gain the exclusivity using a database lock. The users that don't succeed in obtaining a database lock will see the user or project as read-only (e.g., in state 504 or 508).

In one or more embodiments, when the compositing being viewed is out of date (i.e., in state 506 or 510), a visual representation that indicates the user is viewing an out-of date snapshot may be displayed. Such a visual representation may take the form of an icon the reflects a current state. Alternatively, a tool within the user interface may be grayed-out (dimmed), and the icon for a composition in taskbar may indicate the lock state of the composition. Further, the user may be required to explicitly ask/request an update of the snapshot (e.g., via refresh command). In addition, out-of-date snapshots may not be persistently stored. In this regard, when a user quits the application or closes a snapshot, the next time the user logs in or re-accesses the composition, the snapshot will be reloaded using updated data leading to an up-to-date snapshot.

User may also have the option to manually set a read-only flag on a composition (read-only for everybody). Such a set/clear mechanism is available to any user and a different user can clear the read-only flag. The flag is persistent and contains a description, providing the reason why the composition was set to read-only. The flag can be set/cleared from the browser's information panel at the bottom of the screen and applied to the currently selected composition.

Collaboration Details

To implement/manage the database lock and to manage synchronization, one or more embodiments of the invention utilize a permit server (e.g., within computer 200). The permit server coordinates access to the database 210 (e.g., similar to an DBMS 212) and ensures that data kept locally in each application's object cache remains coherent. For example, the permit server ensures that if one workstation/computer 200 opens a composition in read/write mode, any other workstations will have just read-only access to it. In a collaborative environment, the permit server only needs to be installed once, on one machine 200, typically, on the same machine 200 running the database server 212.

The permit server is the central point of synchronization between all of the applications 208 in a collaborative environment. When an application 208 opens a database 210 (that is being managed or appears as a cache to the user), a connection to the permit server is established. Each access to a database's managed object will be reported to the permit server. The consistency schema is of the reader—writer type. In this regard, multiple readers can read the same object at once. However, to modify (write to the database), one must first acquire an exclusive permit that requests all the readers to stop reading. The permit server also supports the locking of a database object that guarantees the lock owner of the exclusivity of write access.

Each database managed object has its own entry in the permit server. The permit server performs concurrency control over the database object access, each entry maintaining two lists of clients. One list is of the owners and the permit that each owner has on the entry. The second list is a list of those waiting for access and the permit that each waiter has requested on the entry. In addition, the database object entry maintains an identification of the owner of the lock on the entry (if one exists). The permit server may issue either an exclusive permit (only one owner can have such a permit at any given time) or a shared permit (in which multiple owners can have shared permits at any given time). When an entry is locked, only the owner of the lock can write (e.g., acquire an exclusive permit) on the associated object.

Clients/applications 208 send permit requests to the permit server via messages across network 214. Client message may include a request for a shared permit (when the client wants to read), an exclusive permit (when the client wants to write), a permit downgrade (when the client acknowledges that it has downgraded its permit from exclusive to shared), a permit release (when the client acknowledges that it has released its permit), a lock permit (when the client wants to lock an object, and lock release (when the client wants to release a lock). The permit server may respond and send the appropriate (or lesser) permit back to the clients as required. Such responses may include a shared permit, an exclusive permit, a revoke permit (when the permit is revoked), a downgrade permit (when a permit has been downgraded to a shared permit), lock acquired (when a lock on an object has been granted), lock in use (when a lock is denied), and reference locked (when a write permit is denied because the entry is locked).

A cache catalog may also be used that maintains cache entries that contain transient copies of database objects. The cache catalog contains the state machine that performs the proper state transition according to internal and external requests. An internal request results from an action performed by the user of the application 208. An external request results from an action performed by another user and is sent by the permit server. Thus, internal requests are actions that are performed by the local application 208 that results in a direct transition in the state machine. As described above, such internal requests may include a lock request, refresh request, read access request, or write access request. However, external requests come from the permit server in response to another user's request.

As described above, an application programming interface (API) user may also attempt to lock an entry. If the user succeeds, a transition occurs. In addition, the API user can refresh an out of date snapshot to obtain the latest version of the entry from the database 210. After such an update operation, the entry may transition to the READ state. The user can also ask to read an entry (an operation that may never fail). Further, a user may ask to write to an entry. Write access can be denied if somebody else has a lock on the entry. Otherwise, the write access will be granted.

As described above, external requests to the cache catalog come from the permit server in response to another user's request.

As described above, the current state of data may exist in a variety of forms. Three (3) variables establish the current state: the permit, the lock status and the snapshot policy.

The permit represents the permit acquired with the permit server. Possible values include PERMIT_NONE, PERMIT_SHARED, and PERMIT_EXCLUSIVE.

The lock status determines whether or not the lock has been acquired from the permit server. Possible values may include LOCKED and NONE.

The snapshot policy determines if the data is permitted to get out of date if somebody else modifies/writes to that entry. If out-of-date is allowed, the pointer will be kept in memory; otherwise it will be flushed. Possible values may include NO_OUT_OF_DATE and ALLOW_OUT_OF_DATE. By default, all the entries are NO_OUT_OF_DATE to make sure the user is always working with an up to date version.

Cache Overview

In view of the above, it may be understood that both media content (i.e., image data) and metadata relating to a composition may be stored in a centralized database. Further, both media content and metadata may be locally cached in accordance with the collaboration and locking mechanisms described above. Accordingly, in the case of metadata, a local copy of the metadata is stored. When opened, a particular user state is entered depending on the lock obtained by the user. For example, when a user opens a setup that is reflected via various entities in one or more tables, the series of relevant tables may be locked such that nobody else has write access to the open tables (e.g., the user has a read-write lock). When the setup is closed, all of the related tables will become available to the user.

With either the media content or metadata, the data may be updated back to the centralized database in a lazy manner. For example, a write command may be placed into a queue that is used depending on the processing needed, network, availability, etc. Such a write operation may be executed whenever a user closes data being accessed in the cache, when another user requests a lock, or other such operation.

Cache Catalog API

Various API may be used to export the functionalities described above. For example, a refresh API may be used to update the transient copy of a database object. Such a refresh API command affects the current state of the entry only if the transient pointer is an out of date snapshot. Further, in order to refresh an object, one simply needs to unload and then reload the object. A locking API command is a low level locking interface that returns a lock object that is automatically released on destruction (i.e., of the object). Further, a state API command may be used to export the state of cache entries (e.g., locked or out of date).

File Import/Output

File importation is an operation by which the user can associate a piece of external media (e.g., image data or media content) with some data kept in the database. In this regard, a file import preview allows the user to apply a tool pipeline (e.g., the various tools in a dependency graph) on an import stream (e.g., operations such as LUT, crop, resize, etc.). The import results in a media node in the composition.

As described above, intermediate results may be generated in the local cache and not written back to the centralized database 210. Accordingly, users on another machine may not have access to and cannot use such intermediate results.

File export occurs when the user renders a composition by creating either a rendered result or a final result. With either a rendered result or a final result, the export results in a sequence of file(s) written outside of the media cache (e.g., in the centralized database 210).

Compositions/dependency graphs within application 208 may need to be exported for archiving. In this regard, the composition may be stored in the file system in a structured manner along with the media files/image content.

As described above, the database 210 may be used in various manners. The database may be used as a centralized storage mechanism for the media content and metadata as described above. In addition, the database may be used as a local cache that is not exposed in a browser (i.e., to users on network 214). When used as a local cache, the user may create and manage compositions using a file system browser (e.g., Windows™ Explorer™. The composition file would contain an XML description that may be updated either automatically on certain events (e.g., when the user quits the application 208 or closes the schematic/dependency graph) or on user demand. The database acts like the media cache (as described above) while storing temporary data. When the user loads a composition, the system may check if a copy is already available in the database in the version described in the file (e.g., determine whether a cache hit has occurred).

With the database cache not exposed to the user, scripting (e.g., using the API described above) can abstract the fact that there is a database. In this regard, scripts that may not discarded can be written without any chance of polluting the library with excessive compositions. Further, the management of the media and data is performed on the file system only, that is consistent.

Even though the database may be used as a local cache, the user may manage such a database cache in a library browser. In this regard, a library browser's contextual menu may be used to export the composition (e.g., to a name and path defined by a project setting).

A library (for managing the database cache) may be seen as an extended file system (i.e., a file system with extra or additional capabilities). Hard links, UDA (universal data access) and specialized queries are features that may be available in such an extended file system that are not available in an NTFS system. With the library approach, the desktop and collaborative work may achieve be fully utilized. However, the difficulty of scripting and library management may increase. In this regard, the user may be required to manage two separate hierarchies—the file system and the library. Each time the user desires to execute a script, the database must be opened and closed. Such execution requirements may be excessive and consume resources if the user has numerous scripts that merely result in external media files with internal compositions that are discarded. In addition, such the names of the intermediate compositions may clash since the library is shared among all users.

Presentation of Data

Using the database 210, a user may have the capability to view data collected across multiple collaborative users. As described above, the API may be used in conjunction with a user interface to present the metadata from the database 210 in a visually appeasing manner. For example, the user may elect to view the data arranged in a report, a pi-chart/graph, histogram, or other mechanism capable of displaying data on an aggregate basis. For example, using a pi-chart, the user can view data relating to projects, setups, users, etc. on a percentage basis across multiple users.

Under any method of presenting the data, the user may need to specify the open mode when opening or displaying the report. The open mode specifies the type of access the user desires for a given report. For example, if a user desires read-write access, the user must anticipate a rejection of the requested lock (e.g., if another user already has such access/lock). In this regard, as described above, a read-write access always implies that a database lock was successfully acquired. However, it is possible that the access mode requested cannot be granted if another user already owns the lock. In an open mode, the user may request read-only access or read-write access.

The number of users currently accessing a report or chart that needs access to multiple tables within database 210 may be stored. Accordingly, when closing a report and the open count goes to zero, if the snapshot is up to date, the report may remain in database cache. Otherwise (e.g., if the snapshot is out-of-date), the database cache containing the report may be flushed (or updated/refreshed).

For performance reasons, it may not be allowed to unload a report (i.e., from cache) while it is opened. Thus, if someone desires write access, the database cache may always go into an out-of-date snapshot state indicating the need to flush or update/refresh once the report is closed.

Refreshing an out-of-date report may be different from refreshing a database object. In some situations, a lock may be needed. Accordingly, when a refresh operation is desired, the application 208 may attempt to acquire a lock.

Similar to accessing data and metadata as described above, the display of a report may need similar collaboration controls (e.g., since the report may be accessed/viewed by multiple collaborating users). Thus, the user state is often retrieved. Such user states may include the following:

| User State | Description |
| --- | --- |
| Read-Write | Lock + RW |
| Read-Only snapshot | !Lock + RW + !Out of Date |
| Out of Sate snapshot | !Lock + RW + Out of Date |
| Read-Only snapshot view | R + !Out of Date |
| Out of Date snapshot view | R + Out of Date |

In view of the above, once the desired lock is obtained, the data may be viewed in a user-selected/designated report. Further, multiple users can view/read the same report simultaneously in the collaborative environment.

Logical Flow

As described above, embodiments of the invention allow multiple users to work on projects and to have dependencies tracked between such users. To track such dependencies in a collaborative environment, a database model is utilized with a centralized database containing tables for storing both image content and metadata relating to nodes in a dependency graph. For example, entities may be created in the database (e.g., a database object) for an artist. Such entities may include setups, projects, users, etc. that relate to a series of rows and columns in database tables.

Since a database model is utilized, standard database queries may be performed (e.g., via SQL) or the database may be accessed using an application programming interface (API). Such API may be used to access and present the data in a user understandable metaphor. For example, the user may be presented with project structures having folders and setups. To create, access, modify, or remove such project structures, folders, and setups (or the entities of a database when using SQL) the database grants various types of locks to the user(s) for rows/columns in the database tables that contain the relevant entities. However, the invention manages the database and access to the database transparently to the user such that user may not be aware of the existence of the underlying database. Instead, the user(s) merely view the data in a form the user is accustomed to.

Further, as artists work on a particular application (or part of an application), the data generated by the artists are placed into the database (e.g., transparently to the users). In this regard, changes made by an artist (e.g., edits to a dependency graph) may be stored locally and updated to the central database using a background thread. The storage of data in such a centralized database avoids conflicts and out-of-date dependencies. In addition, the use of such a centralized database avoids automation processes that could potentially overwrite or disregard data created by artists.

In addition, as indicated above, certain information may be stored in the database that is created automatically by the computers during a rendering operation. Such information can then be used to perform a cost/benefit analysis based on budget or other relevant information.

Figure 6:
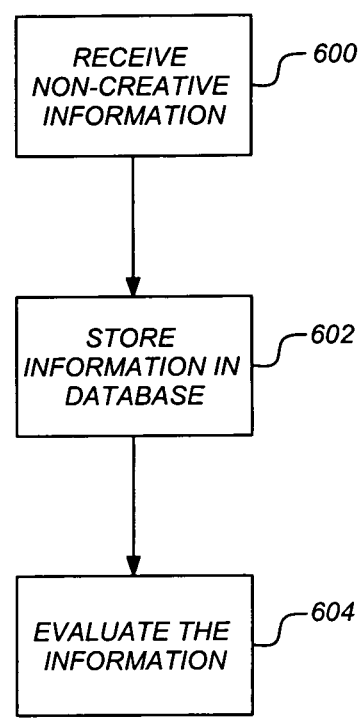
FIG. 6 is a flow chart illustrating the logical flow for performing a method for storing non-creative information (e.g., tracking image processing data) generated during the rendering of image data in a collaborative environment accordance with one or more embodiments of the invention.

FIG. 6 is a flow chart illustrating the logical flow for performing a method for storing non-creative information (e.g., tracking image processing data) generated during the rendering of image data in a collaborative environment accordance with one or more embodiments of the invention.

At step 600, non-creative information that relates to image processing is received. Such non-creative information is generated by a computer pursuant to a rendering operation. For example, such non-creative information may comprise the amount of time taken, the number of CPU cycles, or the amount of storage consumed by the computer took to perform the rendering operation. Further, the rendering operation may be performed by multiple computers in a render farm. In such a situation, the non-creative information that is received is generated by the multiple computers and received at a single location.

At step 602, the non-creative information is stored in a database that is accessible across a network to multiple users/computers. Further, such information may be stored in/with a context to or with a relationship to information generated in a design phase of an image processing operation. For example, the computer based information relating to the amount of time taken to render a particular operation may be associated with a particular node in a dependency graph and the artist responsible for generating the node. Such an relationship/association enables intelligent analysis of the information stored in the database.

At step 604, the non-creative information is evaluated using the database. In this regard, queries or scripts (e.g., via an API) may be used to query the non-creative (and associated creative based information) that is stored in the database. Such information may allow the user to determine a profitability or cost/benefit analysis on numerous basis such as by per artist, per machine, per render farm, per project, per shoot, per setup, etc.

In addition, it may be understood, that similar to the creative-based information, access to the non-creative information must also comply with the collaboration rules regarding the various states for the tables/elements of the database (see detailed description above).

Conclusion

This concludes the description of the preferred embodiment of the invention.

The following describes some alternative embodiments for accomplishing the present invention. For example, any type of computer, such as a mainframe, minicomputer, or personal computer, or computer configuration, such as a timesharing mainframe, local area network, distributed database, or standalone personal computer, could be used with the present invention.

Embodiments of the invention provide the ability for multiple users to work on projects wherein information generated during the rendering process across multiple users is tracked and recorded in a database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for tracking image processing data in a collaborative environment comprising:
   (a) receiving non-creative information relating to image processing, wherein said non-creative information:
      (1) is generated by a computer pursuant to a rendering operation for rendering a clip of image data performed by said computer;
      (2) is generated by tracking render-management aspects of the rendering operation; and
      (3) comprises an amount of time taken by said computer to perform said rendering operation;
   (b) storing said non-creative information in a database, wherein the database is accessible across a network to multiple users; and
   (c) evaluating said non-creative information using the database, wherein said evaluating comprises:
      (1) inputting an average hourly cost for operating said computer; and
      (2) determining a total cost for performing said rendering operation based on the amount of time taken and the average hourly cost.

2. The method of claim 1, wherein said non-creative information comprises a number of CPU cycles by said computer to perform said rendering operation.

3. The method of claim 1, wherein said non-creative information comprises an amount of storage consumed during said rendering operation.

4. The method of claim 1, wherein said rendering operation is performed by multiple computers in a render farm, said method further comprising receiving additional non-creative information generated by the multiple computers pursuant to the rendering operation.

5. The method of claim 1, wherein said non-creative information is stored in the database with a context to information generated in a design phase of said image processing.

6. A computer implemented system for tracking image processing data in a collaborative environment comprising:
   (a) a computer having a memory, wherein said computer is communicatively coupled across a network to one or more additional computers to form a network;
   (b) a processing application executing on the computer, wherein the processing application is configured to:
      (i) receive non-creative information relating to image processing, wherein said non-creative information:
         (1) is generated by one or more of said additional computers pursuant to a rendering operation for rendering a clip of image data performed by said one or more additional computers;
         (2) is generated by tracking render-management aspects of the rendering operation; and
         (3) comprises an amount of time taken by said one or more additional computers to perform said rendering operation;
      (ii) storing said non-creative information in a database, wherein the database is accessible across the network to the one or more additional computers; and
      (iii) evaluating said non-creative information using the database wherein said processing application is configured to evaluate by:
         (1) inputting an average hourly cost for operating said one or more additional computers; and
         (2) determining a total cost for performing said rendering operation based on the amount of time taken and the average hourly cost.

7. The system of claim 6, wherein said non-creative information comprises a number of CPU cycles by said one or more additional computers to perform said rendering operation.

8. The system of claim 6, wherein said non-creative information comprises an amount of storage consumed during said rendering operation.

9. The system of claim 6, wherein said one or more additional computers are part of a render farm configured to perform said rendering operation, said application is further configured to receive additional non-creative information generated by the one or more additional computers pursuant to the rendering operation.

10. The system of claim 6, wherein said non-creative information is stored in the database with a context to information generated in a design phase of said image processing.

11. A non-transitory program storage device, readable by a first computer, tangibly embodying at least one program of instructions executable by the first computer to perform method steps of tracking image processing data in a collaborative environment, the method comprising the steps of:
   (a) receiving non-creative information relating to image processing, wherein said non-creative information:
      (1) is generated by a second computer pursuant to a rendering operation for rendering a clip of image data performed by said second computer;
      (2) is generated by tracking render-management aspects of the rendering operation; and
      (3) comprises an amount of time taken by said second computer to perform said rendering operation
   (b) storing said non-creative information in a database, wherein the database is accessible across a network to multiple users; and
   (c) evaluating said non-creative information using the database, wherein said evaluating comprises:
      (1) inputting an average hourly cost for operating said second computer; and (2) determining a total cost for performing said rendering operation based on the amount of time taken and the average hourly cost.

12. The program storage device of claim 11, wherein said non-creative information comprises a number of CPU cycles by said second computer to perform said rendering operation.

13. The program storage device of claim 11, wherein said non-creative information comprises an amount of storage consumed during said rendering operation.

14. The program storage device of claim 11, wherein said rendering operation is performed by multiple computers in a render farm, said method further comprising receiving additional non-creative information generated by the multiple computers pursuant to the rendering operation.

15. The program storage device of claim 11, wherein said non-creative information is stored in the database with a context to information generated in a design phase of said image processing.

* * * * *